United States Patent
Guo et al.

(10) Patent No.: US 11,240,511 B2
(45) Date of Patent: Feb. 1, 2022

(54) VIDEO ENCODING CODE RATE CONTROL METHOD, APPARATUS, AND DEVICE, AND STORAGE MEDIUM

(71) Applicant: TENCENT TECHNOLOGY (SHENZHEN) COMPANY LIMITED, Shenzhen (CN)

(72) Inventors: Yaoyao Guo, Shenzhen (CN); Xunan Mao, Shenzhen (CN); Chenchen Gu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/884,330

(22) Filed: May 27, 2020

(65) Prior Publication Data

US 2020/0288143 A1 Sep. 10, 2020

Related U.S. Application Data

(63) Continuation of application No. PCT/CN2019/076310, filed on Feb. 27, 2019.

(30) Foreign Application Priority Data

Mar. 28, 2018 (CN) .......................... 201810265922.3

(51) Int. Cl.
*H04N 19/146* (2014.01)
*H04N 19/137* (2014.01)
(Continued)

(52) U.S. Cl.
CPC ......... *H04N 19/146* (2014.11); *H04N 19/137* (2014.11); *H04N 19/14* (2014.11); *H04N 19/159* (2014.11); *H04N 19/172* (2014.11)

(58) Field of Classification Search
CPC .... H04N 19/146; H04N 19/137; H04N 19/14; H04N 19/159; H04N 19/172;
(Continued)

(56) References Cited

U.S. PATENT DOCUMENTS

2005/0286631 A1 12/2005 Wu et al.
2006/0062292 A1* 3/2006 Boice ..................... H04N 19/14
375/240.01
(Continued)

FOREIGN PATENT DOCUMENTS

CN 101325711 A 12/2008
CN 101827267 A 9/2010
(Continued)

OTHER PUBLICATIONS

International Search Report Issued in Application No. PCT/CN2019/076310 dated May 7, 2019, with English Machine Translation (5 pages).
(Continued)

*Primary Examiner* — Jared Walker
(74) *Attorney, Agent, or Firm* — Oblon, McClelland, Maier & Neustadt, L.L.P.

(57) ABSTRACT

A video encoding code rate control method of a terminal device is provided. A space domain complexity and a time domain complexity of a first picture frame in a video stream are obtained. A first target bit of the first picture frame is updated to a second target bit according to the space domain complexity and the time domain complexity. A first initial quantization parameter of the first picture frame is updated to a second initial quantization parameter according to the space domain complexity and the time domain complexity. A compressed code stream of the first picture frame is generated according to the second target bit and the second initial quantization parameter.

20 Claims, 9 Drawing Sheets

(51) Int. Cl.
*H04N 19/14* (2014.01)
*H04N 19/172* (2014.01)
*H04N 19/159* (2014.01)

(58) Field of Classification Search
CPC .. H04N 19/147; H04N 19/124; H04N 19/503; H04N 19/184; H04N 19/593; H04N 19/86
See application file for complete search history.

(56) References Cited

U.S. PATENT DOCUMENTS

| | | | |
|---|---|---|---|
| 2006/0245492 A1 | 11/2006 | Pun et al. | |
| 2008/0025401 A1* | 1/2008 | Lee | H04N 19/176 375/240.16 |
| 2008/0304562 A1 | 12/2008 | Chang et al. | |
| 2010/0166060 A1* | 7/2010 | Ezure | H04N 19/196 375/240.03 |
| 2011/0090960 A1* | 4/2011 | Leontaris | H04N 19/154 375/240.12 |
| 2014/0376616 A1* | 12/2014 | Li | H04N 19/198 375/240.03 |
| 2015/0071343 A1 | 3/2015 | Novotny | |
| 2015/0215621 A1* | 7/2015 | Liu | H04N 19/124 375/240.03 |
| 2015/0326857 A1 | 11/2015 | Zhang et al. | |
| 2016/0337647 A1 | 11/2016 | Cheok et al. | |
| 2016/0372128 A1* | 12/2016 | Baeckstroem | G10L 19/028 |

FOREIGN PATENT DOCUMENTS

| | | |
|---|---|---|
| CN | 104683804 A | 6/2015 |
| WO | 2006/060037 | 6/2006 |

OTHER PUBLICATIONS

Written Opinion Issued in Application No. PCT/CN2019/076310 dated May 7, 2019 (3 pages).
European Search Report dated Mar. 29, 2021 in Application No. 19775531.7, (10 pages).
Office Action dated Nov. 24, 2021 issued in corresponding Japanese patent application No. 2020-544623 (with English translation) citing document AA.

* cited by examiner

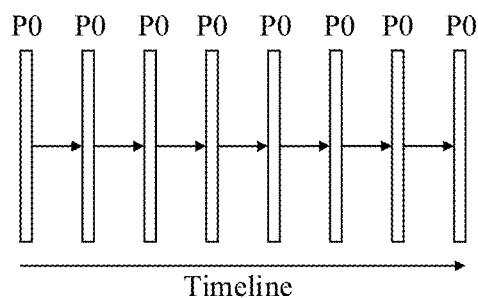

Timeline

FIG. 2

Obtain a motion estimation attribute of a first picture frame and a motion estimation attribute of a second picture frame, the motion estimation attribute of the first picture frame being a ratio of a space domain complexity to a time domain complexity of the first picture frame, a motion estimation attribute of the second picture frame being a ratio of the time domain complexity to the space domain complexity of the second picture frame, and the second picture frame being a previous picture frame of the first picture frame ⎯S102a Obtain a first limiting condition, and adjust a first target bit of the first picture frame to a second target bit according to the first limiting condition, the first limiting condition including a ratio of the motion estimation attribute of the first picture frame to the motion estimation attribute of the second picture frame ⎯S102b

FIG. 3

VIDEO ENCODING CODE RATE CONTROL METHOD, APPARATUS, AND DEVICE, AND STORAGE MEDIUM

RELATED APPLICATION

This application is a continuation of International Application No. PCT/CN2019/076310, filed on Feb. 27, 2019, which claims priority to Chinese Patent Application No. 201810265922.3, entitled "VIDEO ENCODING CODE RATE CONTROL METHOD, APPARATUS, AND DEVICE, AND STORAGE MEDIUM" filed on Mar. 28, 2018. The entire disclosures of the prior applications are hereby incorporated by reference in their entirety.

FIELD OF THE TECHNOLOGY

This application relates to the field of picture processing technologies, such as video encoding code rate control.

BACKGROUND OF THE DISCLOSURE

Code rate control, as an important component of video encoding, can optimize allocation of current remaining target bits according to a state of a channel, and dynamically adjust quantization parameters according to a current condition of an encoder, so as to provide optimal video quality under a limited bandwidth condition.

A technical section of the code rate control is mainly divided into bit allocation and bit control. The bit allocation includes three phases: group of pictures (GOP)-level bit allocation, frame-level bit allocation and macroblock-level bit allocation. Specifically, when the encoder on a terminal side starts encoding a GOP, a target quantity of bits of the current GOP is allocated according to a bandwidth of a current channel, a frame rate of a current video and a length of the GOP. After the bit allocation of the GOP is completed, when a current picture frame is encoded, target bits of the current picture frame are allocated according to a quantity of remaining frames and a quantity of remaining bits in the current GOP. When macroblocks in the current picture frame are encoded, the target bits are allocated to a currently encoding unit according to remaining bit data in the current picture frame and a quantity of macroblocks to be encoded.

In the related art, when bit allocation is performed at a frame level, for the quantity of remaining bits of the current GOP, two modes are mainly used: average allocation and bit allocation according to predetermined weights. This distribution mode can achieve a desirable effect in a continuous natural scene. However, in a real-time video call process, a user may experience a series of complex operations such as mobile phone shaking, light changing, scene transitions or camera switching. Therefore, diversified video call scenes may occur. However, when the picture scene changes, such a bit allocation and quantization parameter calculation solution cannot make an adaptive adjustment according to a change of video content, resulting in a large amount of bits consumed by the current picture frame and causing a relatively long time delay or a video freezing phenomenon, which affects user experience.

SUMMARY

An embodiment of this application provides a video encoding code rate control method. A space domain complexity and a time domain complexity of a first picture frame in a video stream are obtained. A first target bit of the first picture frame is updated to a second target bit according to the space domain complexity and the time domain complexity. A first initial quantization parameter of the first picture frame is updated to a second initial quantization parameter according to the space domain complexity and the time domain complexity. A compressed code stream of the first picture frame is generated according to the second target bit and the second initial quantization parameter.

An embodiment of this application further provides a video encoding code rate control apparatus, including processing circuitry. The processing circuitry is configured to obtain a space domain complexity and a time domain complexity of a first picture frame in a video stream. The processing circuitry is configured to update a first target bit of the first picture frame to a second target bit according to the space domain complexity and the time domain complexity, and update a first initial quantization parameter of the first picture frame to a second initial quantization parameter according to the space domain complexity and the time domain complexity. The processing circuitry is further configured to generate a compressed code stream of the first picture frame according to the second target bit and the second initial quantization parameter.

An embodiment of this application further provides a video encoding code rate control device, including a processor and a memory, the memory storing at least one instruction, at least one program, a code set, or an instruction set, and the at least one instruction, the at least one program, the code set or the instruction set being loaded and executed by the processor to implement the video encoding code rate control method.

An embodiment of this application provides a non-transitory computer-readable storage medium storing instructions which when executed by a processor cause the processor to perform a video encoding code rate control method. A space domain complexity and a time domain complexity of a first picture frame in a video stream are obtained. A first target bit of the first picture frame is updated to a second target bit according to the space domain complexity and the time domain complexity. A first initial quantization parameter of the first picture frame is updated to a second initial quantization parameter according to the space domain complexity and the time domain complexity. A compressed code stream of the first picture frame is generated according to the second target bit and the second initial quantization parameter.

BRIEF DESCRIPTION OF THE DRAWINGS

To describe technical solutions and embodiments of this application more clearly, the following briefly describes the accompanying drawings required for describing the embodiments. The accompanying drawings in the following description show merely exemplary embodiments of this application, and a person of ordinary skill in the art may still derive other drawings from these accompanying drawings.

FIG. 2 is a structural sequence diagram of an IPPP reference frame according to an embodiment of this application.

FIG. 3 is a flowchart of adjusting a first target bit and an initial quantization parameter according to an embodiment of this application.

DESCRIPTION OF EMBODIMENTS

The following describes the technical solutions in the embodiments of this application with reference to the accompanying drawings in the embodiments of this application. The described embodiments are exemplary embodiments of this application rather than all of the embodiments. All other embodiments obtained by a person skilled in the art based on the embodiments of this application shall fall within the protection scope of this application.

The terms such as "first" and "second" in the specification, claims, and the foregoing accompanying drawings of this application are used to distinguish similar objects, and are not necessarily used to describe a specific order or sequence. The data termed in such a way are interchangeable in proper circumstances, so that the embodiments of this application described herein can be implemented in other orders than the order illustrated or described herein. Furthermore, the terms "include", "have" and any variants thereof are intended to cover non-exclusive inclusion. For example, a process, an apparatus, a system, a product, or a device that includes a series of steps or units is not necessarily limited to those steps or units explicitly listed, but may include other steps or units not explicitly listed or inherent to such processes, apparatuses, products or devices.

Figure 1A:
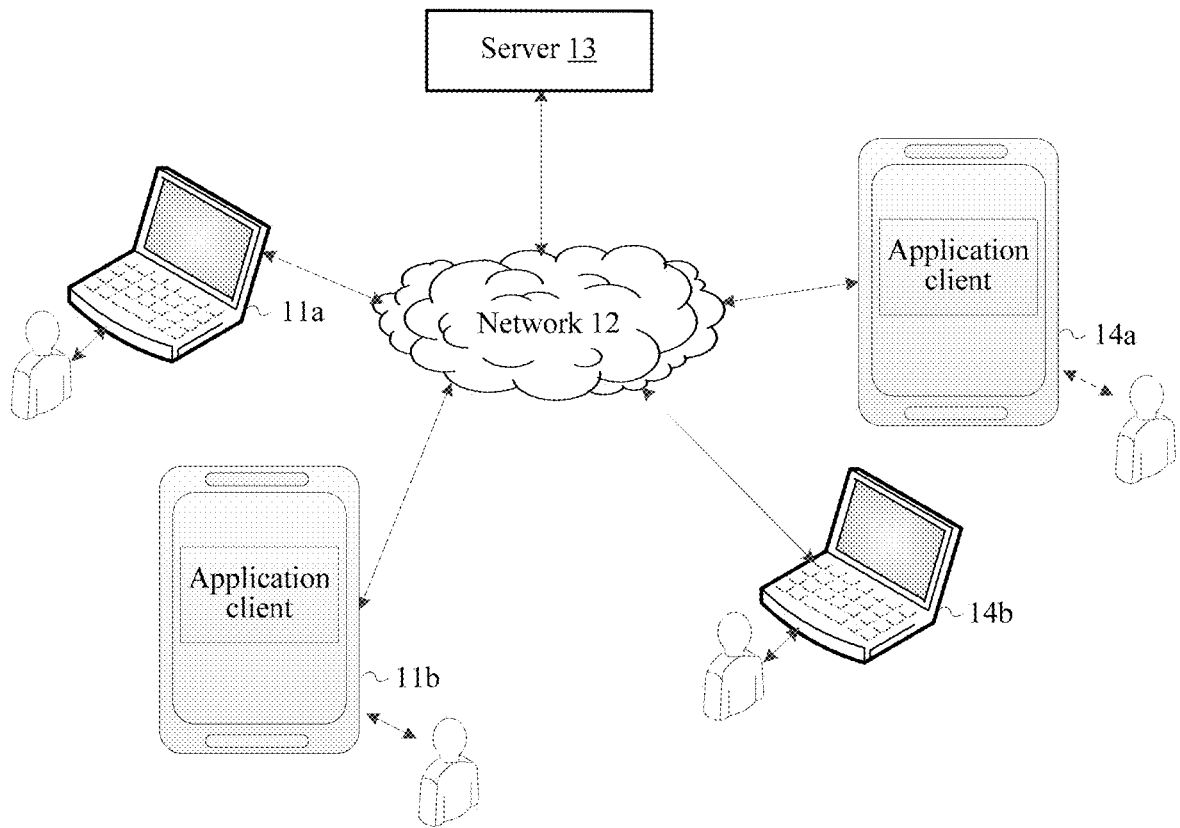
FIG. 1A is a system architecture diagram applicable to a video encoding code rate control method according to an embodiment of this application.

FIG. 1A is a system architecture diagram applicable to a video encoding code rate control method according to an embodiment of this application. As shown in FIG. 1A, the system architecture diagram applicable to the video encoding code rate control method according to some embodiments of this application at least includes: a first terminal (e.g., 11a or 11b), a network 12, and a server 13. In addition, the system architecture diagram applicable to the video encoding code rate control method according to some embodiments of this application may further include: a second terminal (e.g., 14a or 14b).

In some examples of this application, the first terminal and the second terminal may refer to intelligent devices having a data computing and processing function, and include but are not limited to a smartphone, a palmtop computer, a tablet computer, a personal computer, and the like (e.g., in which a communications module is installed). An operating system is installed on the first terminal, including but not limited to: an Android operating system, a Symbian operating system, a Windows mobile operating system, an Apple iPhone OS operating system, and the like. The first terminal and the second terminal are provided with various application clients such as an application client for video encoding code rate control.

The network 12 may include a wired network and a wireless network. As shown in FIG. 1A, on a side of an access network, the first terminal and the second terminal may access the network 12 in a wireless or wired manner. However, on a side of a core network, the server 13 is usually connected to the network 12 in a wired manner. The server 13 may alternatively be connected to the network 12 in a wireless manner.

The server 13 may be a server of an application client, and is mainly configured to receive a compressed code stream transmitted by a terminal device. The server 13 may be an independent server, or may be a cluster server including a plurality of servers.

Figure 1B:
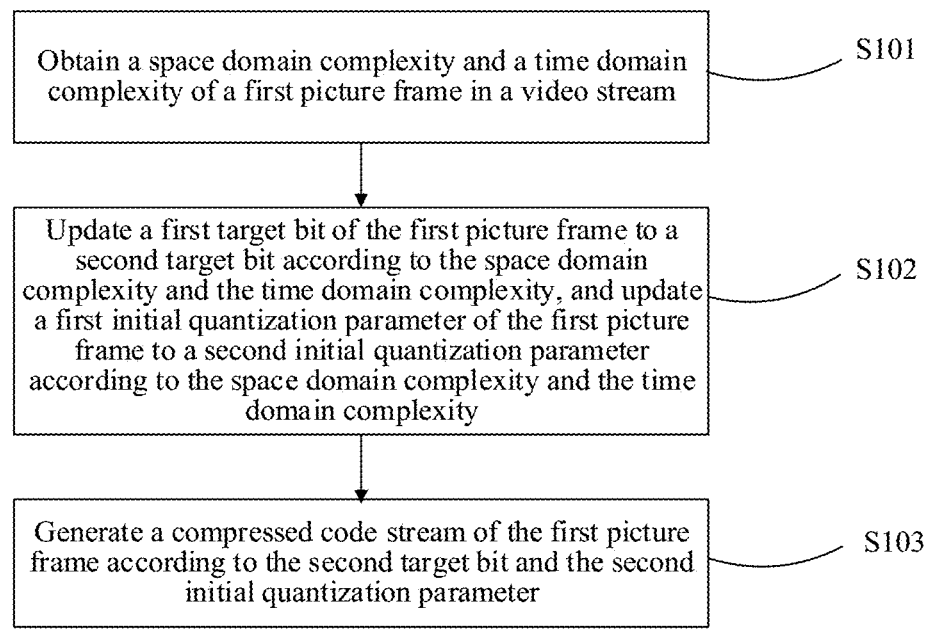
FIG. 1B is a flowchart of a video encoding code rate control method according to an embodiment of this application.

Based on the system architecture diagram shown in FIG. 1A, an embodiment of this application provides a video encoding code rate control method executed by a terminal device. The terminal device may be a first terminal, or may be a second terminal. As shown in FIG. 1B, the method can include the following steps.

In step S101, a space domain complexity and a time domain complexity of a first picture frame in a video stream are obtained.

In step S101, video information is captured by using a corresponding picture capture device (e.g., a camera) of a current mobile terminal. Specifically, picture frames in a video to be transmitted are obtained, and a picture frame to be transmitted is used as a first picture frame (a current picture frame), which serves as an object of subsequent processing.

A frame is a single image picture of a minimum unit in a video, a single frame is a still picture, and continuous frames form an animation, a video, or the like. Usually, the quantity of frames, in short, is the quantity of frames of pictures transmitted in one second, which may also be interpreted as the number of refreshes per second of a graphics processor, and may be generally represented by frames per second (FPS). Each frame is a still picture, and frames displayed quickly and continuously produce a motion illusion. A smooth and vivid animation may be obtained with a high frame rate. As FPS increases, a displayed action is smoother.

Further, the first picture frame is processed to obtain a space domain complexity of the first picture frame and a time domain complexity of the first picture frame.

The processing of the first picture frame may include: downsampling a video picture, and then calculating a space domain complexity and a time domain complexity of the downsampled picture by using an 8*8 pixel block as a basic unit. Each pixel block may be referred to as one basic unit.

This solution is applied to a real-time communication process. A reference frame in the encoding process mainly adopts an intra picture and predicted picture (IPPP) format structure. The IPPP is an encoding structure, in which only P frames exist and the current frame may only refer to a forward frame, as shown in FIG. 2.

The space domain complexity of the first picture frame is used for representing a texture complexity of the first picture frame. A scene with higher space complexity indicates a higher value of the space domain complexity. The space domain complexity corresponds to intra-frame prediction. The intra-frame prediction is prediction based on an encoded block in the same frame, to construct a prediction block and calculate a residual with the current block, thereby encoding information such as the residual and the prediction mode. The intra-frame prediction is mainly to remove spatial redundancy. The time domain complexity of the first picture frame is a time domain correlation between the first picture frame and an encoded picture frame in a group of pictures in which the first picture frame is located, and is used for representing a time variation of a picture frame sequence. The picture frame sequence having a relatively high motion degree usually has a relatively high time domain complexity value. The time domain complexity corresponds to inter-frame prediction. The inter-frame prediction is prediction based on one or more encoded frames, to construct a prediction block and calculate a residual with the current block, thereby encoding information such as the residual, the prediction mode, a motion vector residual, and a reference picture index. The inter-frame prediction is mainly to remove temporal redundancy.

In step S102, a first target bit of the first picture frame is updated to a second target bit according to the space domain complexity and the time domain complexity. A first initial quantization parameter of the first picture frame is updated to a second initial quantization parameter according to the space domain complexity and the time domain complexity.

The first target bit is an existing target bit, and the first initial quantization parameter is an existing initial quantization parameter. The second target bit is a new target bit, and the second initial quantization parameter is a new initial quantization parameter.

The existing target bit is a target bit allocated, after an encoder of the terminal device allocates a target bit quantity to the group of pictures in which the first picture frame is located, to the first picture frame according to a remaining frame quantity and a remaining bit quantity in the current group of pictures during encoding of the first picture frame.

The existing initial quantization parameter is a quantization parameter obtained through calculation according to the existing target bit of the first picture frame.

Specifically, in step S102, as shown in FIG. 3, the updating a first target bit of the first picture frame to a second target bit according to the space domain complexity and the time domain complexity can include the following steps.

In step S102a, a motion estimation attribute of the first picture frame and a motion estimation attribute of a second picture frame are obtained, the motion estimation attribute of the first picture frame being a ratio of the space domain complexity to the time domain complexity of the first picture frame, the motion estimation attribute of the second picture frame being a ratio of the time domain complexity to the space domain complexity of the second picture frame, and the second picture frame being a previous picture frame of the first picture frame.

In step S102b. A first limiting condition is obtained, and the first target bit of the first picture frame is adjusted to the second target bit according to the first limiting condition, the first limiting condition including a ratio of the motion estimation attribute of the first picture frame to the motion estimation attribute of the second picture frame.

Specifically, in step S102, the updating a first initial quantization parameter of the first picture frame to a second initial quantization parameter according to the space domain complexity and the time domain complexity includes obtaining a second limiting condition, and updating the first initial quantization parameter of the first picture frame to the second initial quantization parameter according to the second limiting condition, the second limiting condition including a ratio of the space domain complexity of the first picture frame to a space domain complexity of a second picture frame, and a ratio of the space domain complexity of the first picture frame to a space domain complexity of a previous picture frame of the second picture frame.

After the first target bit of the first picture frame is adjusted to the second target bit, that is, after the bit allocation is completed, a bit control stage is required. Specifically, bit control is performed by using a quadratic rate-distortion model. A formula corresponding to the quadratic rate-distortion model is shown in formula (1):

$$\frac{R - R_{Head}}{M} = a \times QP^{-1} + b \times QP^{-2}. \quad (1)$$

In formula (1), $R_{Head}$ is the quantity of bits consumed for header information of the macroblock, M is a mean absolute difference (MAD) of a residual signal of the first picture frame (the current picture frame), and a and b are corresponding limiting parameters. The MAD is obtained by updating formula (2):

$$MAD(j) = p_1 \times MAD(j-1) + p_2 \quad (2).$$

In formula (2), MAD(j−1) represents an actual MAD value of a previous frame of the current picture frame, and p1 and p2 are corresponding limiting parameters.

In step S103, a compressed code stream of the first picture frame is generated according to the second target bit and the second initial quantization parameter.

The code stream refers to data traffic used by a video file per unit time, and can be the most important part of picture quality control in video encoding. In this embodiment, the existing target bit and the initial quantization parameter are adjusted to adapt to scene switching, so as to obtain a video stream suitable for transmission, namely, a compressed code stream.

In this embodiment, according to a time domain correlation between the first picture frame (the current picture frame) and the second picture frame (the previous picture frame) and a space domain correlation of the first picture frame, the target bit quantity and the encoding quantization parameter of the first picture frame are adjusted, thereby effectively reducing a peak code rate per second when a scene is switched or a scene is moved, and avoiding code rate runaway, so that the video stream can be smoothly transmitted.

Figure 4:
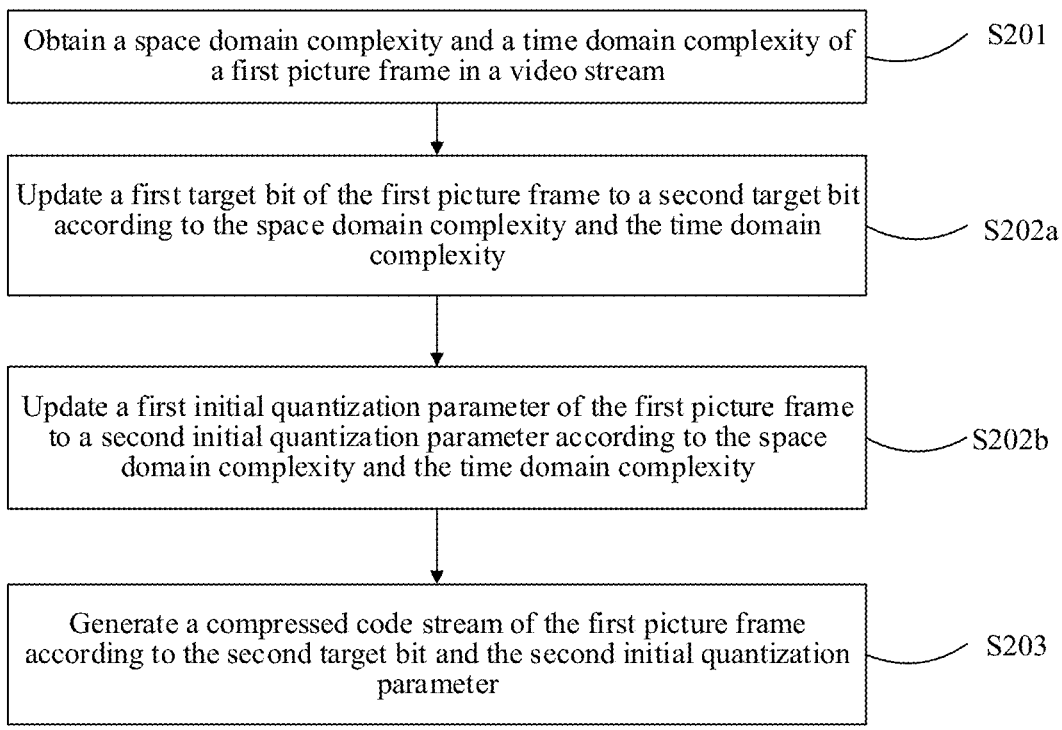
FIG. 4 is a flowchart of another video encoding code rate control method according to an embodiment of this application.

An embodiment of this application further provides another video encoding code rate control method. As shown in FIG. 4, the method can include the following steps.

In step S201, a space domain complexity and a time domain complexity of a first picture frame in a video stream are obtained.

In some embodiments, a video picture is downsampled, and then a space domain complexity Icost and a time domain complexity Pcost of the downsampled picture are calculated by using an 8*8 pixel block as a basic unit. Each pixel block may be regarded as one basic unit. The basic unit may be equal to the foregoing macroblock.

In step S201, the obtaining a space domain complexity of a first picture frame in a video stream includes: obtaining an optimal intra-frame prediction cost of a first basic unit in the first picture frame; and obtaining the space domain complexity of the first picture frame according to the optimal intra-frame prediction cost of the first basic unit. The optimal intra-frame prediction cost is a calculated estimated quantity of bits consumed by the first picture frame. Further, in the optimal intra-frame prediction cost, the amount of distortion of the first picture frame may also be considered. That is, the optimal intra-frame prediction cost may also be a weighted sum of the quantity of estimated bits consumed by the first picture frame and the amount of distortion of the first picture frame.

Figure 5:
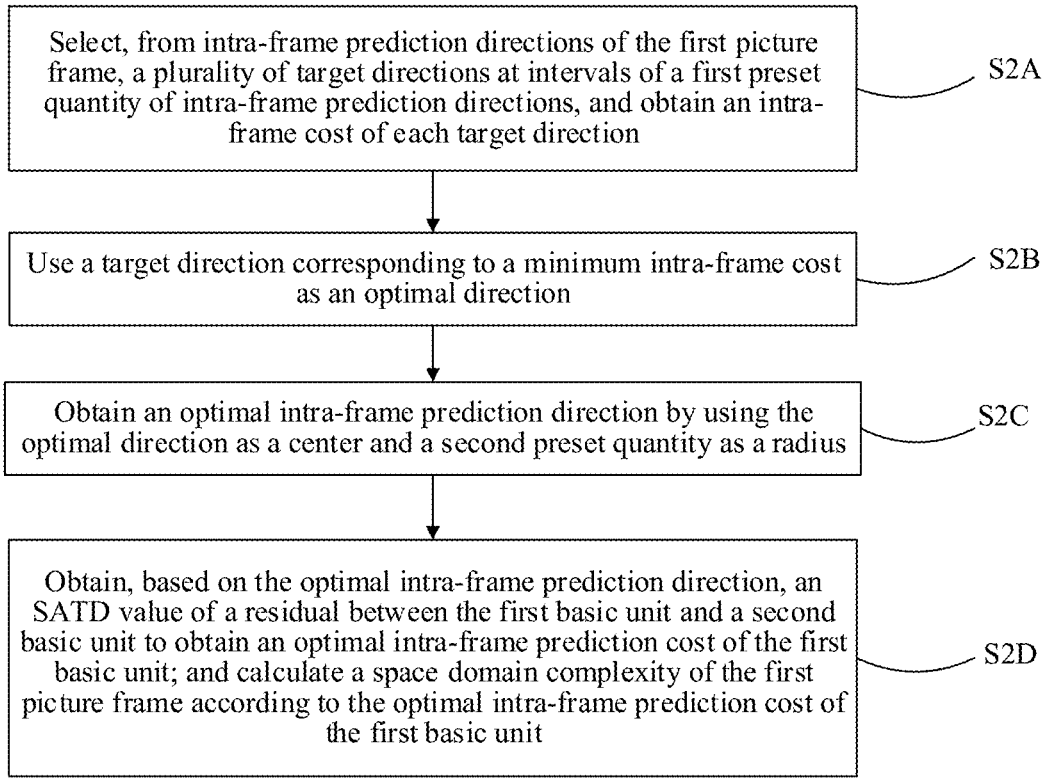
FIG. 5 is a flowchart of obtaining a space domain complexity of a first picture frame according to an embodiment of this application.

As shown in FIG. 5, the method specifically includes the following steps.

In step S2A, a plurality of target directions is selected, from intra-frame prediction directions of the first picture frame, at intervals of a first preset quantity of intra-frame prediction directions. An intra-frame cost of each target direction is obtained.

In step S2B, a target direction corresponding to a minimum intra-frame cost is used as an optimal direction.

In step S2C, an optimal intra-frame prediction direction is obtained by using the optimal direction as a center and a second preset quantity as a radius.

In step S2C, in some embodiments, the second preset quantity is half of the first preset quantity.

For example, if the first preset quantity is 8, the optimal intra-frame prediction direction is obtained by using the optimal direction as the center and 8/2 as the radius. That is, with the optimal direction as the center, four basic units are searched for on the left side and the right side respectively to obtain the optimal intra-frame prediction direction.

In step S2D, a sum of absolute transformed differences (SATD) value of a residual between the first basic unit and a second basic unit is obtained, based on the optimal intra-frame prediction direction, to obtain an optimal intra-frame prediction cost of the first basic unit. The space domain complexity of the first picture frame is calculated according to the optimal intra-frame prediction cost of the first basic unit.

The second basic unit is a basic unit in the optimal intra-frame prediction direction. The SATD is a measure of a size of a video residual signal, and the value of the SATD is obtained by performing a Hadamard transform on a corresponding residual and then summing absolute values. In a video coding standard, the Hadamard transform is mostly used for calculating the SATD.

For example, in this embodiment, a picture frame having 35 intra-frame directions is used as an example. The optimal intra-frame prediction direction of the first basic unit is obtained first. The optimal intra-frame prediction direction is obtained in two stages: First, the intra-frame cost is calculated by taking one direction from the 35 intra-frame prediction directions at intervals of Δ directions, and after primary screening in this mode, the optimal direction is obtained. In the second phase, the optimal direction is used as a center to search for an optimal intra-frame prediction direction within a radius of Δ/2. A value of Δ being 8 is used as an example.

Based on the optimal prediction direction, the SATD value of the residual between the first basic unit and the second basic unit is calculated to obtain the optimal intra-frame prediction cost of the first basic unit. Further, the optimal intra-frame prediction cost of the first picture frame, that is, the space domain complexity of the first picture frame is calculated according to the optimal intra-frame prediction cost of the first basic unit. The space domain complexity Icost of the first picture frame is represented by $\psi_{I\_cur}$ and the space domain complexity Icost of the second picture frame is represented by $\psi_{I\_pre}$.

In step S202, the obtaining a time domain complexity of the first picture frame includes: obtaining an optimal inter-frame prediction cost of a first basic unit in the first picture frame; and obtaining the time domain complexity of the first picture frame according to the optimal inter-frame prediction cost of the first basic unit.

Figure 6:
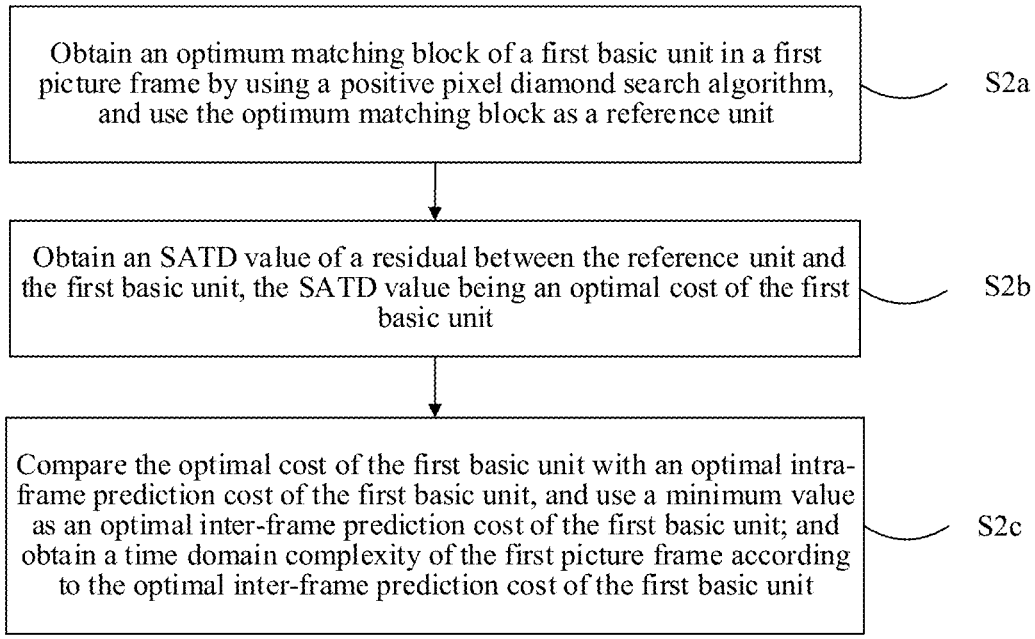
FIG. 6 is a flowchart of obtaining a time domain complexity of the first picture frame according to an embodiment of this application.

As shown in FIG. 6, the method specifically includes the following steps.

In step S2a, an optimum matching block of the first basic unit in the first picture frame is obtained by using a positive pixel diamond search algorithm, and the optimum matching block is used as a reference unit.

In step S2b, an SATD value of a residual between the reference unit and the first basic unit is obtained, the SATD value being an optimal cost of the first basic unit.

The obtaining a time domain complexity of the first picture frame further includes the following step S2c, in which the optimal cost of the first basic unit is compared with an optimal intra-frame prediction cost of the first basic unit. A minimum value is used as an optimal inter-frame prediction cost of the first basic unit. The time domain complexity of the first picture frame is obtained according to the optimal inter-frame prediction cost of the first basic unit.

For example, in this embodiment, an optimal best matching block of the first basic unit is obtained by using a positive pixel diamond search algorithm, and the best matching block is used as a reference unit. After the reference unit is determined, the SATD value of the residual is further calculated as the optimal cost of the first basic unit. Finally, the obtained optimal cost is compared with Icost of the first basic unit, and a minimum value is used as Pcost of the first basic unit. Pcost of the first picture frame is further obtained. Pcost of the first picture frame is represented by $\psi_{P\_cur}$, and Pcost of the previous frame of the first picture frame is represented by $\psi_{P\_pre}$.

Further, in this embodiment, $\psi_{IP\_cur}$ is used to represent a motion situation of the first picture frame, and specific calculation is as follows:

$$\psi_{IP\_cur} = \frac{\psi_{I\_cur}}{\psi_{P\_cur}} \quad (3)$$

It can be learned from formula (3) that in a case that textures in previous and current frames do not vary greatly, the first picture frame is relatively static, and in this case, $\psi_{P\_cur}$ is close to 0 and $\psi_{IP\_cur}$ is larger. Correspondingly, as the motion of the first picture frame becomes more intensive, $\psi_{P\_cur}$ is larger, which directly results in a smaller $\psi_{IP\_cur}$. Therefore, $\psi_{IP\_cur}$ directly reflects motion intensity of the first picture frame.

Figure 7:
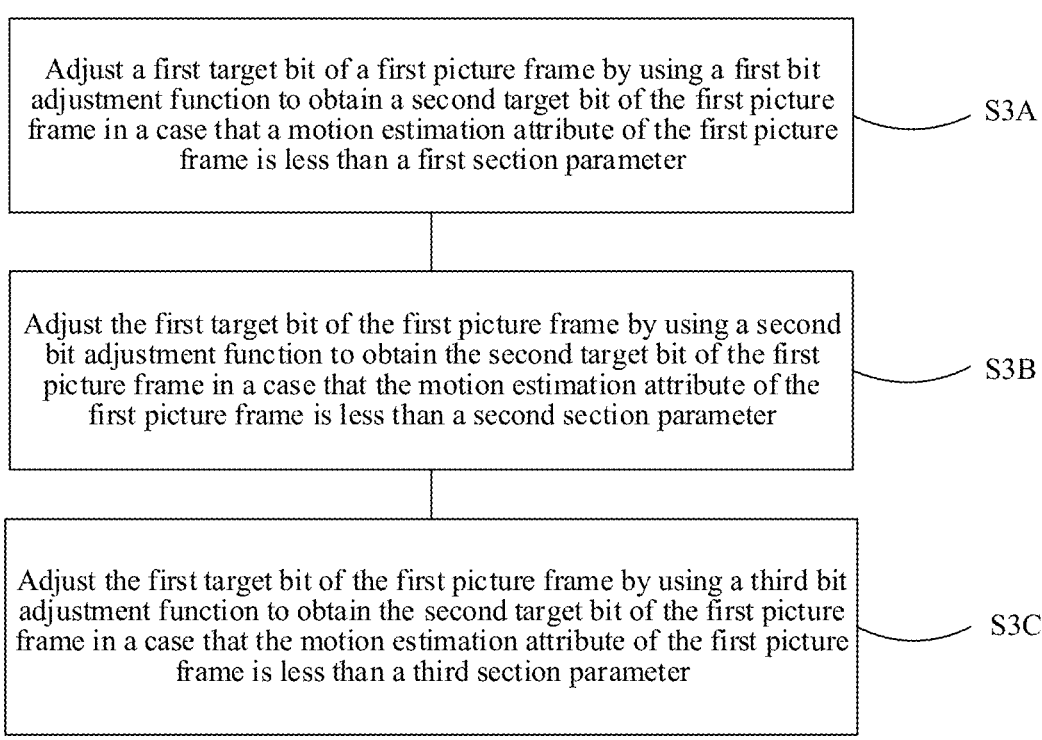
FIG. 7 is a flowchart of obtaining a second target bit of the first picture frame according to an embodiment of this application.

In step S202a, a first target bit of the first picture frame is updated to a second target bit according to the space domain complexity and the time domain complexity; as shown in FIG. 7, this step includes the following steps. For example, the first target bit of the first picture frame is adjusted to the second target bit according to a bit adjustment function in a case that the motion estimation attribute of the first picture frame is less than a section parameter. The adjustment can be performed by one or more of the following steps.

In step S3A, the first target bit of the first picture frame is adjusted by using a first bit adjustment function to obtain the second target bit of the first picture frame in a case that a motion estimation attribute of the first picture frame is less than a first section parameter.

In step S3B, the first target bit of the first picture frame is adjusted by using a second bit adjustment function to obtain the second target bit of the first picture frame in a case that the motion estimation attribute of the first picture frame is less than a second section parameter.

In step S3C, the first target bit of the first picture frame is adjusted by using a third bit adjustment function to obtain the second target bit of the first picture frame in a case that the motion estimation attribute of the first picture frame is less than a third section parameter.

Values of the first section parameter, the second section parameter, and the third section parameter belong to a same trend, and sequentially increase in this embodiment.

For example, the first picture frame is a current picture frame, and the second picture frame is a previous picture frame, that is, a previous picture frame of the current picture frame.

The ratio of the time domain complexity $\psi_{1\_cur}$ to the space domain complexity $\psi_{P\_cur}$ corresponding to the first picture frame is used as the motion estimation attribute $\psi_{IP\_cur}$ of the first picture frame. The ratio of the time domain complexity $\psi_{1\_pre}$ to the space domain complexity $\psi_{P\_pre}$ corresponding to the second picture frame is used as the motion estimation attribute $\psi_{IP\_pre}$ of the second picture frame.

The ratio of the motion estimation attribute $\psi_{IP\_cur}$ of the first picture frame and the ratio of the motion estimation attribute $\psi_{IP\_pre}$ of the second picture frame is used as a limiting condition to adjust the first target bit $R_{Tar}$ of the first picture frame, to obtain the second target bit $R_{Tar}'$ of the first picture frame.

Specifically, the adjusting the first target bit $R_{Tar}$ of the first picture frame to obtain the second target bit $R_{Tar}'$ of the first picture frame includes: after the target bit $R_{Tar}$ is obtained according to an existing calculation mode of the target bit, setting a piecewise function according to the time and space domain complexities of a first picture, and setting three grades $\alpha_1$, $\alpha_2$ and $\alpha_3$ according to the value of $\psi_{IP\_cur}$, to adjust $R_{Tar}$. $\alpha_1$, $\alpha_2$ and $\alpha_3$ are set to 2.5, 3, 3.5 respectively in this embodiment.

(1) When $\psi_{IP\_cur} < \alpha_1$, the following formula (the first bit adjustment function) is used to adjust the first target bit $R_{Tar}$ of the first picture frame to obtain the second target bit $R_{Tar}'$ of the first picture frame:

$$R_{Tar}' = \begin{cases} \sigma_1 \times R_{Tar} & \psi_{IP\_pre}/\psi_{IP\_cur} \geq \beta_1 \\ \sigma_2 \times R_{Tar} & \beta_2 \leq \psi_{IP\_pre}/\psi_{IP\_cur} < \beta_1 \\ \sigma_3 \times R_{Tar} & \beta_3 \leq \psi_{IP\_pre}/\psi_{IP\_cur} < \beta_2 \end{cases} \quad (4)$$

$\alpha_1$, $\alpha_2$ and $\alpha_3$ are weights for adjusting $R_{Tar}$ according to the time and space domain complexities of the picture; $\beta_1$, $\beta_2$ and $\beta_3$ are a first condition parameter, a second condition parameter and a third condition parameter respectively. In this embodiment, $\alpha_1$, $\alpha_2$ and $\alpha_3$ are set to 3.2, 2.6 and 1.6 respectively, and $\beta_1$, $\beta_2$ and $\beta_3$ are set to 3, 2.5, and 2 respectively.

In addition, in this case, when $\psi_{IP\_cur} < \alpha_1$, the picture fluctuates sharply, and it is possible that the texture of the image itself also fluctuates significantly. In this case, an additional limiting condition is added to adjust the target bit. Therefore, when $\psi_{IP\_cur} < \alpha_1$, the adjusting the first target bit $R_{Tar}$ of the first picture frame further includes: adjusting the first target bit $R_{Tar}$ of the first picture frame by using the following formula (a fourth bit adjustment function) to obtain the second target bit $R_{Tar}'$ of the first picture frame:

$$R_{Tar}' = \sigma_4 \times R_{Tar} \psi_{P\_cur}/\psi_{P\_pre} > \beta_4 \quad (5)$$

$\sigma_4$ is a fourth weight for adjusting $R_{Tar}$, and $\beta_4$ is a fourth condition parameter. In the embodiment, $\sigma_4$ is set to 2, and $\beta_4$ is set to 5.

(2) When $\psi_{IP\_cur} < \alpha_2$ the following formula (the second bit adjustment function) is used to adjust the first target bit $R_{Tar}$ of the first picture frame to obtain the second target bit $R_{Tar}'$ of the first picture frame:

$$R_{Tar}' = \begin{cases} \sigma_5 \times R_{Tar} & \psi_{IP\_pre}/\psi_{IP\_cur} \geq \beta_5 \\ \sigma_6 \times R_{Tar} & \beta_6 \leq \psi_{IP\_pre}/\psi_{IP\_cur} < \beta_5 \end{cases} \quad (6)$$

$\sigma_5$ and $\sigma_6$ are a fifth weight and a sixth weight for adjusting $R_{Tar}$; $\beta_5$ and $\beta_6$ are a fifth condition parameter and a sixth condition parameter respectively. In this embodiment, $\sigma_5$ and $\sigma_6$ are set to 2.6 and 2, and $\beta_5$ and $\beta_6$ are set to 2 and 1.5.

(3) When $\psi_{IP\_cur} < \alpha_3$, the following formula (the third bit adjustment function) is used to adjust the first target bit $R_{Tar}$ of the first picture frame to obtain the second target bit $R_{Tar}'$ of the first picture frame:

$$R_{Tar}' = \sigma_7 \times R_{Tar} \psi_{IP\_pre}/\psi_{IP\_cur} \geq \beta_7 \quad (7)$$

$\sigma_7$ is a seventh weight for adjusting $R_{Tar}$; $\beta_7$ is a seventh conditional parameter. In this embodiment, $\sigma_7$ is set to 2, and $\beta_7$ is set to 1.2.

The corresponding piecewise function may further be adjusted according to a scene requirement. For example, the first bit adjustment function corresponding to the case of $\psi_{IP\_cur} < \alpha_1$ may be set to a piecewise function with four pieces; for data obtained by adjustment based on the piecewise function with four pieces, an effect finally displayed at a receiving end needs to be further tested and adjusted, and appropriate parameters are selected to meet the scene requirement.

Figure 8:
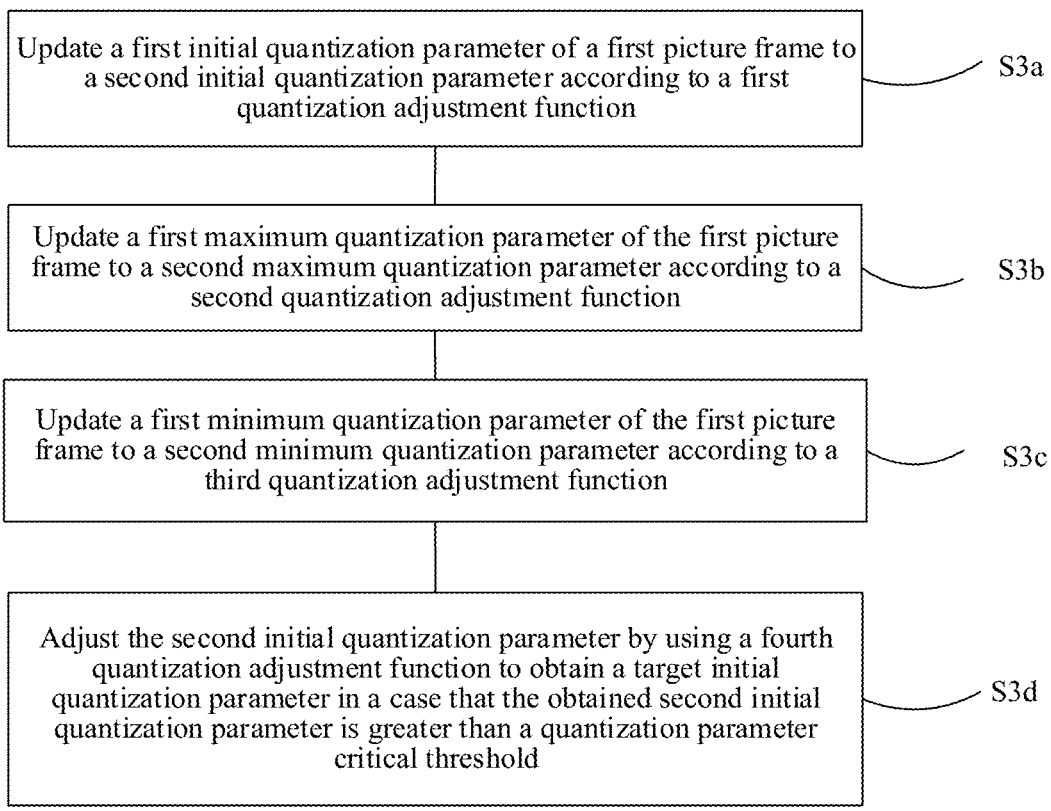
FIG. 8 is a flowchart of obtaining a second initial quantization parameter of the first picture frame according to an embodiment of this application.

In step S202b, a first initial quantization parameter of the first picture frame is updated to a second initial quantization parameter according to the space domain complexity and the time domain complexity. As shown in FIG. 8, this step includes the following step S3a, in which the first initial quantization parameter of the first picture frame is updated to the second initial quantization parameter according to a first quantization adjustment function.

After that, the method further includes the following steps. A step S3b, in which a first maximum quantization parameter of the first picture frame is updated to a second maximum quantization parameter according to a second quantization adjustment function; and/or a step S3c, in which a first minimum quantization parameter of the first picture frame is updated to a second minimum quantization parameter according to a third quantization adjustment function.

After the updating the first initial quantization parameter of the first picture frame to the second initial quantization parameter according to a first quantization adjustment function, the method further includes the following step S3d, in which the second initial quantization parameter is adjusted by using a fourth quantization adjustment function to obtain a target initial quantization parameter in a case that the obtained second initial quantization parameter is greater than a quantization parameter critical threshold.

For example, the first picture frame is a current picture frame, and the second picture frame is a previous picture frame, that is, a previous picture frame of the current picture frame.

The ratio of the space domain complexity $\psi_{P\_cur}$ of the first picture frame to the space domain complexity $\psi_{P\_pre}$ of the second picture frame and the ratio of the space domain complexity $\psi_{P\_cur}$ of the first picture frame to the space domain complexity $\psi_{P\_prepre}$ of the previous picture frame of the second picture frame are used as a limiting condition. The first initial quantization parameter of the first picture frame $QP_{frame}$ is adjusted to obtain the second initial quantization parameter $QP_{frame}'$ of the first picture frame.

Specifically, the adjusting the first initial quantization parameter $QP_{frame}$ of the first picture frame to obtain $QP_{frame}'$ includes:

(1) adjusting the first initial quantization parameter $QP_{frame}$ of the first picture frame by using the following formula (the first quantization adjustment function):

$$QP_{frame}' = \begin{cases} QP_{frame} + \lambda_1 \ \psi_{P\_cur}/\psi_{P\_pre} > \omega_1 \ \& \ \psi_{P\_cur}/\psi_{P\_prepre} > \omega_2 \\ QP_{frame} + \lambda_2 \ \psi_{P\_cur}/\psi_{P\_pre} > \omega_3 \ \& \ \psi_{P\_cur}/\psi_{P\_prepre} > \omega_4 \end{cases} \quad (8)$$

to obtain the second initial quantization parameter $QP_{frame}'$ of the first picture frame.

(2) After the step of adjusting the first initial quantization parameter $QP_{frame}$ of the first picture frame to obtain $QP_{frame}'$, the method further includes adjusting a range corresponding to the initial quantization parameter. Specifically, the maximum quantization parameter and the minimum quantization parameter corresponding to the initial quantization parameter are adjusted.

The first maximum quantization parameter $QP_{max}$ of the first picture frame is adjusted by using the following formula (the second quantization adjustment function):

$$QP_{max}' = \begin{cases} QP_{max} + \lambda_1 \ \psi_{P\_cur}/\psi_{P\_pre} > \omega_1 \ \& \ \psi_{P\_cur}/\psi_{P\_prepre} > \omega_2 \\ QP_{max} + \lambda_2 \ \psi_{P\_cur}/\psi_{P\_pre} > \omega_3 \ \& \ \psi_{P\_cur}/\psi_{P\_prepre} > \omega_4 \end{cases} \quad (9)$$

to obtain the second maximum quantization parameter $QP_{max}'$ of the first picture frame.

The first minimum quantization parameter $QP_{min}$ of the first picture frame is adjusted by using the following formula (the third quantization adjustment function):

$$QP_{min}' = \begin{cases} QP_{min} + \lambda_1 \ \psi_{P\_cur}/\psi_{P\_pre} > \omega_1 \ \& \ \psi_{P\_cur}/\psi_{P\_prepre} > \omega_2 \\ QP_{min} + \lambda_2 \ \psi_{P\_cur}/\psi_{P\_pre} > \omega_3 \ \& \ \psi_{P\_cur}/\psi_{P\_prepre} > \omega_4 \end{cases} \quad (10)$$

to obtain the second minimum quantization parameter $QP_{min}'$ of the first picture frame.

In the foregoing formula, whether the first picture frame is in a large-amplitude motion scene is determined according to a Pcost relationship between the first picture frame and the second picture frame, and a Pcost relationship between the first picture frame (the current picture frame) and a picture frame prior to the previous picture frame (e.g., the picture frame prior to the second picture frame (the previous picture frame)). If the first picture frame is in the large-amplitude motion scene, the initial quantization parameter of the first picture frame needs to be up-regulated, to avoid consuming excessive bits during encoding.

In the foregoing formula, $\psi_{P\_pre}$ and $\psi_{P\_prepre}$ represent Pcost of the second picture frame and Pcost of the picture frame prior to the previous picture frame (e.g., the picture frame prior to the second picture frame (the previous picture frame)) respectively. Both $\omega_1$ and $\omega_3$ are thresholds of a Pcost ratio between the first picture frame and the second picture frame (the previous picture frame). In this embodiment, $\omega_1$ and $\omega_3$ are set to 6 and 3. Both $\omega_2$ and $\omega_4$ are thresholds of a Pcost ratio between the first picture frame and the picture frame prior to the second picture frame. In this embodiment, $\omega_2$ and $\omega_4$ are set to 8 and 4. $\lambda_1$ and $\lambda_2$ are a first offset value and a second offset value corresponding to the current initial QP, the maximum QP and the minimum QP respectively. In this embodiment, $\lambda_1$ and $\lambda_2$ are set to 6 and 3.

In the encoding process, a blocking effect easily occurs if the QP value is excessively large. Therefore, on the basis of formula (8) to formula (10), the quantization parameter QP of the first picture frame needs to be adjusted.

(3) Therefore, after the second initial quantization parameter $QP_{frame}'$ of the first picture frame is obtained, the method further includes:

adjusting the first initial quantization parameter of the first picture frame by using the following formula (a fourth quantization adjustment function):

$$QP_{initial} = \begin{cases} (QP_{frame}' + QP_{Thr} + 1)/2 & QP_{frame}' > QP_{Thr} \\ QP_{frame}' & \text{otherwise} \end{cases} \quad (11)$$

to obtain a final target initial quantization parameter $QP_{initial}$ for encoding. $QP_{Thr}$ is a critical threshold of the first picture frame. In this embodiment, $QP_{Thr}$ is set to 35; $QP_{initial}$ the final initial is quantization parameter QP for encoding, that is, the target initial quantization parameter, obtained after the adjustment according to the time-space domain correlation of the first picture frame.

In step S203, a compressed code stream of the first picture frame is generated according to the second target bit and the second initial quantization parameter.

In this embodiment, the existing target bit is adjusted according to different fluctuation degrees of the first picture frame in different scenes, and the existing quantization parameters (e.g., the initial quantization parameter, the maximum quantization parameter and the minimum quantization parameter) are properly adjusted according to different time domain correlations between the first picture frame and the second picture frame in different scenes. That is, the picture parameters may be adaptively adjusted according to a content characteristic of the current picture, so that relatively few bits are consumed in the process of transmitting the first picture frame, and a long time delay or a video freezing phenomenon is avoided in the real-time video process, thereby improving user experience.

Figure 9:
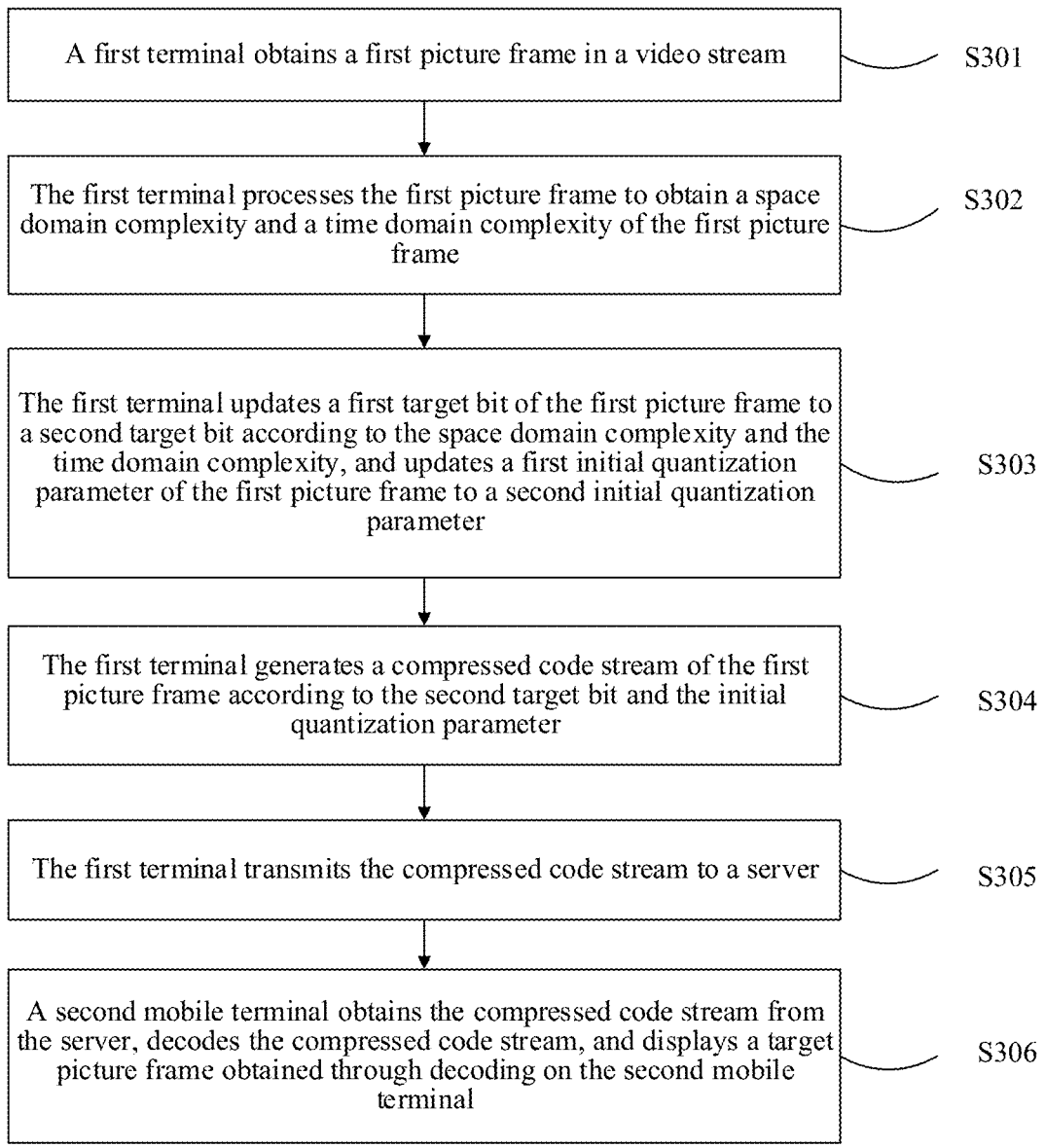
FIG. 9 is a flowchart of another video encoding code rate control method according to an embodiment of this application.

An embodiment provides a video encoding code rate control method. As shown in FIG. 9, the method includes the following steps.

In step S301, a first terminal obtains a first picture frame in a video stream.

In step S302, the first terminal processes the first picture frame to obtain a space domain complexity of the first picture frame and a time domain complexity of the first picture frame.

In step S303, the first terminal updates a first target bit of the first picture frame to a second target bit according to the space domain complexity and the time domain complexity, and updates a first initial quantization parameter of the first picture frame to a second initial quantization parameter.

In step S304, the first terminal generates a compressed code stream of the first picture frame according to the second target bit and the initial quantization parameter.

In step S305, the first terminal transmits the compressed code stream to a server.

In step S306, a second mobile terminal obtains the compressed code stream from the server, decodes the compressed code stream, and displays, on the second mobile terminal, a target picture frame obtained through decoding.

In this embodiment, before transmitting video data, the first terminal first adjusts parameters of a picture frame to be transmitted, to obtain a compressed code stream applicable to a requirement of a scene, so that fewer bits are consumed during the transmission of the video data and the video data can be transmitted smoothly, thereby improving user viscosity of a corresponding application.

Figure 10:
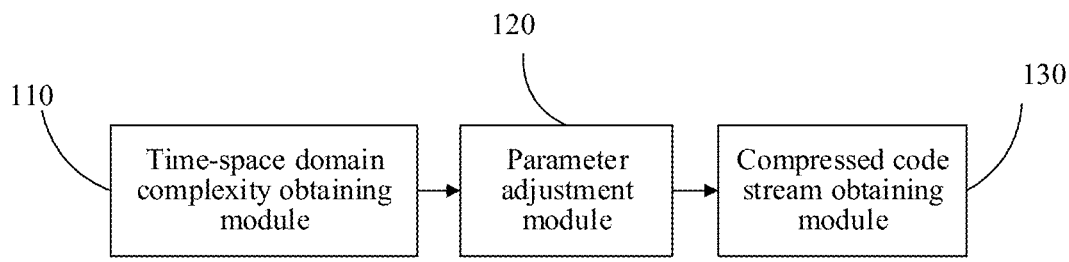
FIG. 10 is a block diagram of a video encoding code rate control apparatus according to an embodiment of this application.

An embodiment provides a video encoding code rate control apparatus. As shown in FIG. 10, the apparatus includes a time-space domain complexity obtaining module 110, a parameter adjustment module 120, and a compressed code stream obtaining module 130. One or more or the modules can be implemented by processing circuitry.

The time-space domain complexity obtaining module 110 is configured to obtain a space domain complexity and a time domain complexity of a first picture frame in a video stream.

The parameter adjustment module 120 is configured to update a first target bit of the first picture frame to a second target bit according to the space domain complexity and the time domain complexity, and update a first initial quantization parameter of the first picture frame to a second initial quantization parameter according to the space domain complexity and the time domain complexity.

The compressed code stream obtaining module 130, configured to generate a compressed code stream of the first picture frame according to the second target bit and the second initial quantization parameter.

The apparatus in the apparatus embodiment can be based on the same concept as the method embodiment.

Figure 11:
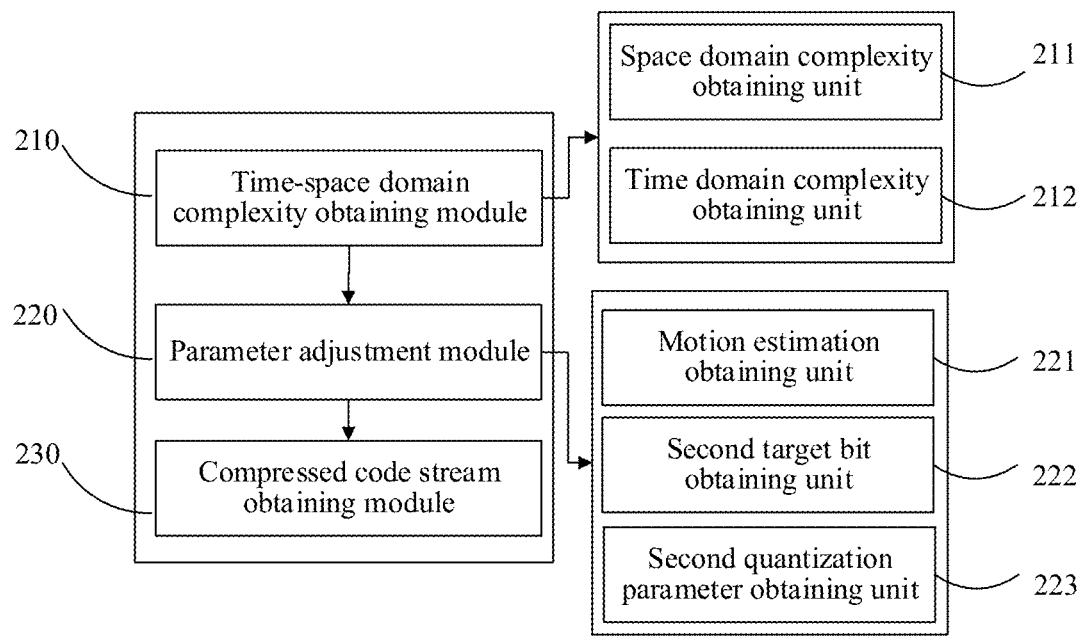
FIG. 11 is a block diagram of another video encoding code rate control apparatus according to an embodiment of this application.

An embodiment provides a video encoding code rate control apparatus. As shown in FIG. 11, the apparatus includes a time-space domain complexity obtaining module 210, configured to obtain a space domain complexity of a first picture frame, and obtain a time domain complexity of the first picture frame in a video stream.

Figure 12:
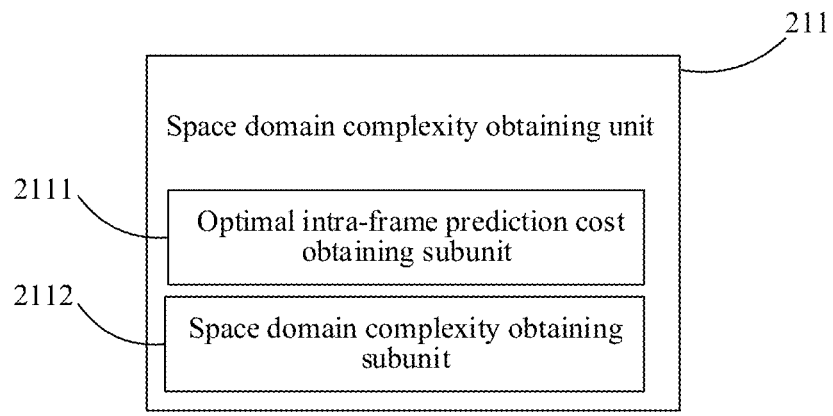
FIG. 12 is a component block diagram of a space domain complexity obtaining unit according to an embodiment of this application.

Specifically, the time-space domain complexity obtaining module 210 includes a space domain complexity obtaining unit 211. As shown in FIG. 12, the space domain complexity obtaining unit 211 includes an optimal intra-frame prediction cost obtaining subunit 2111 and a space domain complexity obtaining subunit 2112.

The optimal intra-frame prediction cost obtaining subunit 2111 is configured to obtain an optimal intra-frame prediction cost of a first basic unit in the first picture frame. The space domain complexity obtaining subunit 2112 is configured to obtain the space domain complexity of the first picture frame according to the optimal intra-frame prediction cost of the first basic unit.

More specifically, the space domain complexity obtaining unit may include a target direction intra-frame cost obtaining subunit, an optimal intra-frame prediction direction obtaining subunit, and a space domain complexity obtaining subunit.

The target direction intra-frame cost obtaining subunit is configured to select, from intra-frame prediction directions of the first picture frame, a plurality of target directions at intervals of a first preset quantity of intra-frame prediction directions, and obtain an intra-frame cost of each target direction.

The optimal intra-frame prediction direction obtaining subunit is configured to use a target direction corresponding to a minimum intra-frame cost as an optimal direction, and obtain an optimal intra-frame prediction direction by using the optimal direction as a center and a second preset quantity as a radius.

The space domain complexity obtaining subunit is configured to obtain, based on the optimal intra-frame prediction direction, an SATD value of a residual between the first basic unit and a second basic unit to obtain an optimal intra-frame prediction cost of the first basic unit; and calculate a space domain complexity of a current picture frame according to the optimal intra-frame prediction cost of the first basic unit.

Figure 13:
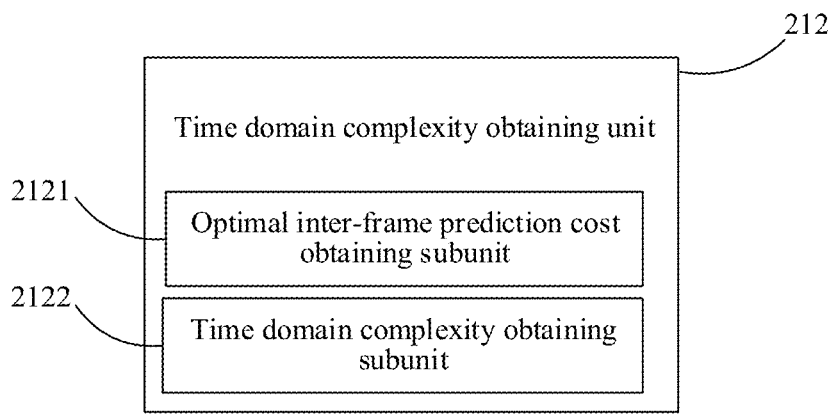
FIG. 13 is a component block diagram of a time domain complexity obtaining unit according to an embodiment of this application.

Further, the time-space domain complexity obtaining module 210 includes a time domain complexity obtaining unit 212. As shown in FIG. 13, the time domain complexity obtaining unit 212 includes an optimal inter-frame prediction cost obtaining subunit 2121 and a time domain complexity obtaining subunit 2122. The optimal inter-frame prediction cost obtaining subunit 2121 is configured to obtain an optimal inter-frame prediction cost of the first basic unit in the first picture frame. The time domain complexity obtaining subunit 2122 is configured to obtain the time domain complexity of the first picture frame according to the optimal inter-frame prediction cost of the first basic unit.

More specifically, the time domain complexity obtaining unit may include a reference unit obtaining subunit, a first basic unit optimal cost obtaining subunit, and a time domain complexity obtaining subunit. The reference unit obtaining subunit is configured to obtain an optimum matching block of the first basic unit in the first picture frame, and use the optimum matching block as a reference unit. The first basic unit optimal cost obtaining subunit is configured to obtain an SATD value of a residual between the reference unit and the first basic unit, the SATD value being an optimal cost of the first basic unit. The time domain complexity obtaining subunit is configured to compare the optimal cost of the first basic unit with the space domain complexity of the first picture frame, and use a minimum value in a comparison result as a space domain complexity of the first picture frame and the second picture frame of the first basic unit.

A parameter adjustment module 220 is configured to adjust a first target bit of the first picture frame according to the space domain complexity and the time domain complexity to obtain a second target bit of the first picture frame; and adjust a first initial quantization parameter of the first picture frame according to the space domain complexity and the time domain complexity to obtain a second initial quantization parameter of the first picture frame.

Figure 14:
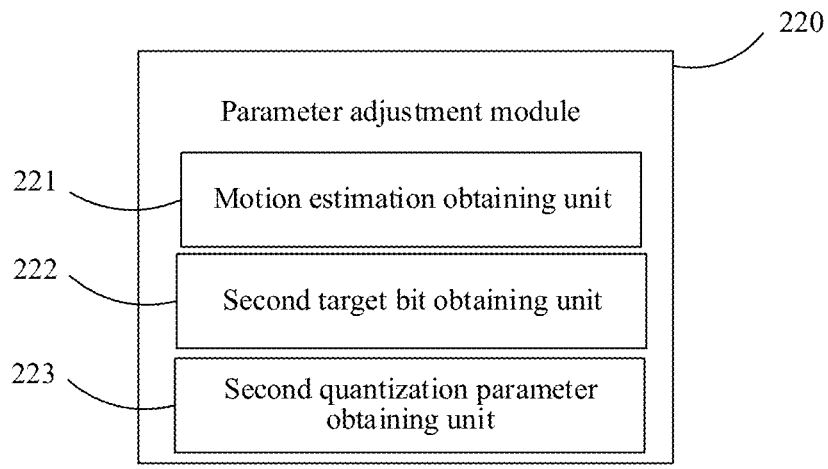
FIG. 14 is a component block diagram of a parameter adjustment module according to an embodiment of this application.

Specifically, as shown in FIG. 14, the parameter adjustment module 220 includes a motion estimation obtaining unit 221 and a second target bit obtaining unit 222.

The motion estimation obtaining unit 221 is configured to obtain a motion estimation attribute of the first picture frame and a motion estimation attribute of a second picture frame, the motion estimation attribute of the first picture frame being a ratio of the space domain complexity to the time domain complexity of the first picture frame and being used for representing motion intensity of the first picture frame, the motion estimation attribute of the second picture frame being a ratio of the time domain complexity to the space domain complexity of the second picture frame and being used for representing motion intensity of the second picture frame, and the second picture frame being a previous picture frame of the first picture frame.

The second target bit obtaining unit 222 is configured to obtain a first limiting condition, and adjust the first target bit of the first picture frame to the second target bit according to the first limiting condition, the first limiting condition including a ratio of the motion estimation attribute of the first picture frame to the motion estimation attribute of the second picture frame.

Figure 15:
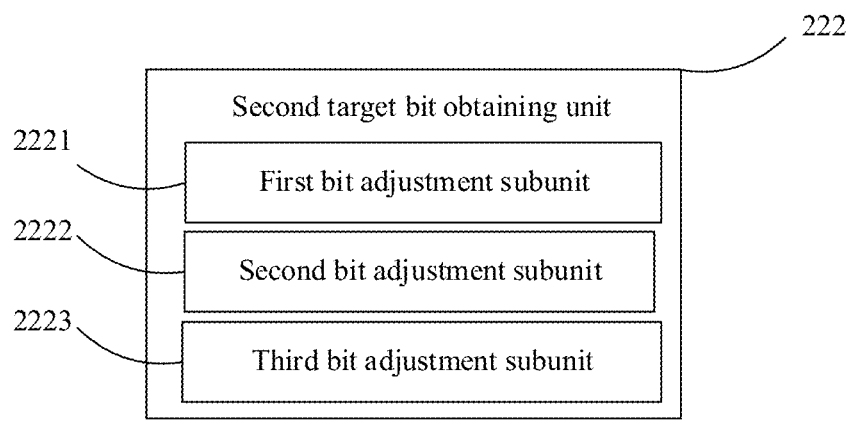
FIG. 15 is a component block diagram of a second target bit obtaining unit according to an embodiment of this application.

Specifically, as shown in FIG. 15, the second target bit obtaining unit 222 includes a bit adjustment subunit configured to adjust the first target bit of the first picture frame to the second target bit according to a bit adjustment function in a case that the motion estimation attribute of the first picture frame is less than a section parameter. The subunit can correspond to one or more of a first bit adjustment subunit 2221, a second bit adjustment subunit 2222, and a third bit adjustment subunit 2223.

The first bit adjustment subunit 2221 is configured to adjust the first target bit of the first picture frame to the second target bit according to a first bit adjustment function in a case that the motion estimation attribute of the first picture frame is less than a first section parameter. The second bit adjustment subunit 2222 is configured to adjust the first target bit of the first picture frame to the second target bit according to a second bit adjustment function in a case that the motion estimation attribute of the first image frame is less than a second section parameter. The third bit adjustment subunit 2223 is configured to adjust the first target bit of the first picture frame to the second target bit according to a third bit adjustment function in a case that the motion estimation attribute of the first image frame is less than a third section parameter.

The first section parameter, the second section parameter, and the third section parameter increase sequentially.

Further, the parameter adjustment module 220 includes a second quantization parameter obtaining unit 223, configured to obtain a second limiting condition, and update the first initial quantization parameter of the first picture frame to the second initial quantization parameter according to the second limiting condition, the second limiting condition including a ratio of the space domain complexity of the first picture frame to a space domain complexity of a second picture frame, and a ratio of the space domain complexity of the first picture frame to a space domain complexity of a previous picture frame of the second picture frame.

Figure 16:
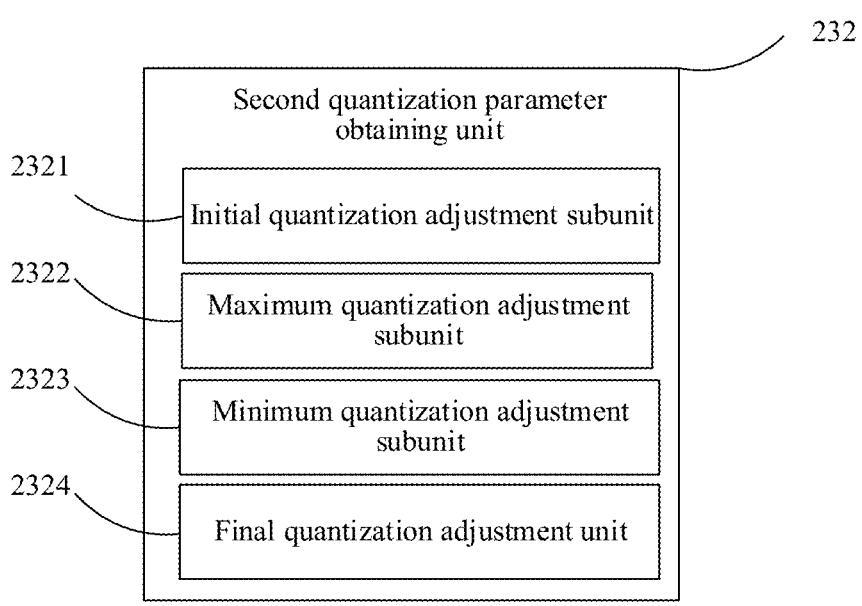
FIG. 16 is a component block diagram of a second quantization parameter obtaining unit according to an embodiment of this application.

As shown in FIG. 16, the second quantization parameter obtaining unit 232 includes an initial quantization adjustment subunit 2321, configured to update the first initial quantization parameter of the first picture frame to the second initial quantization parameter according to a first quantization adjustment function.

As shown in FIG. 16, the second quantization parameter obtaining unit 232 further includes a maximum quantization adjustment subunit 2322 and/or a minimum quantization adjustment subunit 2323. The maximum quantization adjustment subunit 2322 is configured to update a first maximum quantization parameter of the first picture frame to a second maximum quantization parameter according to a second quantization adjustment function. The minimum quantization adjustment subunit 2323 is configured to update a first minimum quantization parameter of the first picture frame to a second minimum quantization parameter according to a third quantization adjustment function.

The quantization parameter obtaining unit further includes a final quantization adjustment unit 2324 and a compressed code stream obtaining module 230.

The final quantization adjustment unit 2324 is configured to update the second initial quantization parameter to a target initial quantization parameter according to a fourth quantization adjustment function in a case that the second initial quantization parameter is greater than a quantization parameter critical threshold. The compressed code stream obtaining module 230 is configured to generate a compressed code stream of the first picture frame according to the second target bit and the second initial quantization parameter.

The apparatus in the apparatus embodiment can be based on the same concept as the method embodiment.

An embodiment of this application further provides a video encoding code rate control device, including a processor and a memory, the memory storing at least one instruction, at least one program, a code set, or an instruction set, and the at least one instruction, the at least one program, the code set or the instruction set being loaded and executed by the processor to implement the video encoding code rate control method according to the method embodiments.

An embodiment of this application provides a computer-readable storage medium (e.g., non-transitory computer-readable storage medium), the storage medium storing at least one instruction, at least one program, a code set, or an instruction set, and the at least one instruction, the at least one one program, the code set or the instruction set being loaded and executed by a processor to implement the video encoding code rate control method according to the method embodiments. The at least one instruction, the at least one program, the code set or the instruction set includes instructions used for performing the following operations: obtaining a space domain complexity of a first picture frame, and obtaining a time domain complexity of the first picture frame in a video stream; updating a first target bit of the first picture frame to a second target bit according to the space domain complexity and the time domain complexity, and updating a first initial quantization parameter of the first picture frame to a second initial quantization parameter according to the space domain complexity and the time domain complexity; and generating a compressed code stream of the first picture frame according to the second target bit and the second initial quantization parameter.

Figure 17:
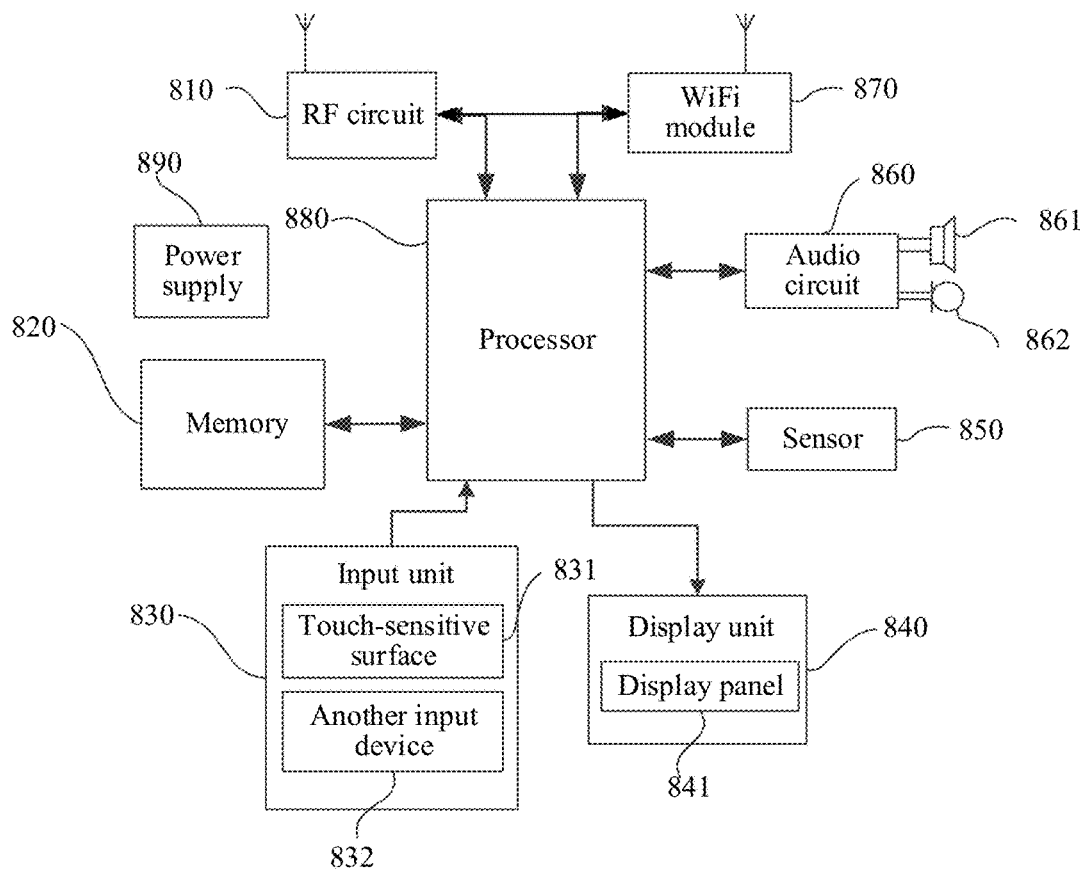
FIG. 17 is a schematic diagram of a video encoding code rate control terminal according to an embodiment of this application.

An embodiment of this application further provides a video encoding code rate control device. The device may be configured to implement the video encoding code rate control method according to the foregoing embodiments. An exemplary device is illustrated in FIG. 17.

The device may include components such as a radio frequency (RF) circuit 810, a memory 820 including one or more computer-readable storage media, an input unit 830, a display unit 840, a sensor 850, an audio circuit 860, a Wi-Fi module 870, a processor 880 including one or more processing cores, and a power supply 890. A person skilled in the art may understand that the structure of the device shown in FIG. 17 does not constitute a limitation to the device, and the device may include more components or fewer components than those shown in the figure, or some components may be combined, or a different component deployment may be used.

The RF circuit 810 may be configured to receive and transmit a signal during an information receiving and transmitting process or a call process. Specifically, the RF circuit receives downlink information from a base station, then delivers the downlink information to one or more processors 880 for processing, and transmits related uplink data to the base station. Generally, the RF circuit 810 includes, but is not limited to, an antenna, at least one amplifier, a tuner, one or more oscillators, a subscriber identity module (SIM) card, a transceiver, a coupler, a low noise amplifier (LNA), a duplexer, and the like. In addition, the RF circuit 810 may also communicate with a network and another device by wireless communication. The wireless communication may use any communications standard or protocol, including but not limited to a Global System for Mobile Communications (GSM), a general packet radio service (GPRS), Code Division Multiple Access (CDMA), Wideband Code Division Multiple Access (WCDMA), Long Term Evolution (LTE), an e-mail, a short message service (SMS), or the like.

The memory 820 may be configured to store a software program and module. The processor 880 runs the software program and module stored in the memory 820, to implement various functional applications and data processing. The memory 820 may mainly include a program storage area and a data storage area. The program storage area may store an operating system, an application program required by a function, and the like. The data storage area may store data created according to use of the device, and the like. In addition, the memory 820 may include a high-speed random access memory, and may also include a non-volatile memory, such as at least one magnetic disk storage device, a flash memory, or another volatile solid-state storage device. The memory 820 may further include a memory controller, so as to provide access of the processor 880 and the input unit 830 to the memory 820.

The input unit 830 may be configured to: receive input digit or character information, and generate a keyboard, mouse, joystick, optical, or trackball signal input related to a user setting and function control. Specifically, the input unit 830 may include a touch-sensitive surface 831 and another input device 832. The touch-sensitive surface 831 may also be referred to as a touch display screen or a touch panel, and may collect a touch operation of a user on or near the touch-sensitive surface (such as an operation of a user on or near the touch-sensitive surface 831 by using any suitable object or accessory, such as a finger or a stylus), and drive a corresponding connection apparatus according to a preset program. Optionally, the touch-sensitive surface 831 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 880. In addition, the touch controller can receive a command transmitted by the processor 880 and execute the command. In addition, the touch-sensitive surface 831 may be implemented by using various types, such as a resistive type, a capacitance type, an infrared type, and a surface sound wave type. In addition to the touch-sensitive surface 831, the input unit 830 may further include another input device 832. Specifically, the another input device 832 may include, but is not limited to, one or more of a physical keyboard, a functional key (e.g., a volume control key or a switch key), a trackball, a mouse, and a joystick.

The display unit 840 may be configured to display information inputted by the user or information provided for the user, and various graphical user interfaces of the device. The graphical user interfaces may include a graph, a text, an icon, a video and any combination thereof. The display unit 840 may include a display panel 841. In some embodiments, the display panel 841 may be configured by using a liquid crystal display (LCD), an organic light-emitting diode (OLED), or the like. Further, the touch-sensitive surface 831 may cover the display panel 841. After detecting a touch operation on or near the touch-sensitive surface, the touch-sensitive surface 831 transfers the touch operation to the processor 880, so as to determine the type of the touch event. The processor 880 then provides a corresponding visual output on the display panel 841 according to the type of the touch event. The touch-sensitive surface 831 and the display panel 841 may be used as two separate components to implement an input function and an output function. In some embodiments, the touch-sensitive surface 831 and the display panel 841 may be integrated to implement the input function and the output function.

The device may further include at least one sensor 850 such as a light sensor, a motion sensor, and another sensor. Specifically, the optical sensor may include an ambient light sensor and a proximity sensor. The ambient light sensor may adjust luminance of the display panel 841 according to brightness of the ambient light. The proximity sensor may switch off the display panel 841 and/or backlight when the device is moved to ears. As one type of the motion sensor, a gravity acceleration sensor may detect a magnitude of accelerations in various directions (generally three axis), may detect a magnitude and a direction of the gravity when static, and may be used in an application that recognizes a device attitude (e.g., switching between horizontal and longitudinal screens, a related game, and magnetometer attitude calibration), a function related to vibration identification (e.g., pedometer and a knock), and the like. Other sensors such as a gyroscope, a barometer, a hygrometer, a thermometer, and an infrared sensor that may be configured in the device are not described herein again.

The audio circuit 860, a loudspeaker 861, and a microphone 862 may provide audio interfaces between the user and the device. The audio circuit 860 may convert received audio data into an electrical signal and transmit the electrical signal to the speaker 861. The speaker 861 converts the electrical signal into a sound signal for output. On the other hand, the microphone 862 converts a collected sound signal into an electrical signal. The audio circuit 860 receives the electrical signal, converts the electrical signal into audio data, and outputs the audio data to the processor 880 for processing. Then, the processor 880 transmits the audio data to, for example, another device by using the RF circuit 810, or outputs the audio data to the memory 820 for further processing. The audio circuit 860 may further include an earplug jack, to provide communication between a peripheral earphone and the device.

Wi-Fi belongs to a short distance wireless transmission technology. The device may help, by using the Wi-Fi module 870, a user receive and transmit e-mails, browse a web page, access streaming media, and so on. The Wi-Fi module provides wireless broadband Internet access for the user. Although FIG. 17 shows the Wi-Fi module 870, it may be understood that the Wi-Fi module is not a necessary component of the device, and may be omitted according to a requirement without changing the scope of the essence of the present disclosure.

The processor 880 (e.g., processing circuitry) is a control center of the device, and is connected to various parts of the entire device by using various interfaces and lines. By running or executing the software program and/or module stored in the memory 820, and invoking data stored in the memory 820, the processor performs various functions and data processing of the device, thereby performing overall monitoring on the device. In some embodiments, the processor 880 may include the one or more processing cores. In some embodiments, the processor 880 may integrate an application processor and a modem processor. The application processor mainly processes an operating system, a user interface, an application program, and the like. The modem processor mainly processes wireless communication. It may be understood that the modem processor alternatively may not be integrated into the processor 880.

The device further includes the power supply 890 (e.g., a battery) for supplying power to the components. In some embodiments, the power supply may be logically connected to the processor 880 by using a power management system, thereby implementing functions such as charging, discharging, and power consumption management by using the power management system. The power supply 890 may further include one or more of a direct current or alternate current power supply, a re-charging system, a power failure detection circuit, a power supply converter or inverter, a power supply state indicator, and any other component.

Although not shown in the figure, the device may further include a camera, a Bluetooth module, and the like, which are not described herein. Specifically, in this embodiment, the display unit of the device is a touchscreen display, and the device further includes a memory and one or more programs. The one or more programs are stored in the memory, and configured to be executed by one or more processors to execute instructions in the apparatus embodiments of this application. Specifically, the processor is configured to execute the following operations: obtaining a space domain complexity of a first picture frame, and obtaining a time domain complexity of the first picture frame in a video stream; updating a first target bit of the first picture frame to a second target bit according to the space domain complexity and the time domain complexity, and updating a first initial quantization parameter of the first picture frame to a second initial quantization parameter according to the space domain complexity and the time domain complexity; and generating a compressed code stream of the first picture frame according to the second target bit and the second initial quantization parameter.

Figure 18:
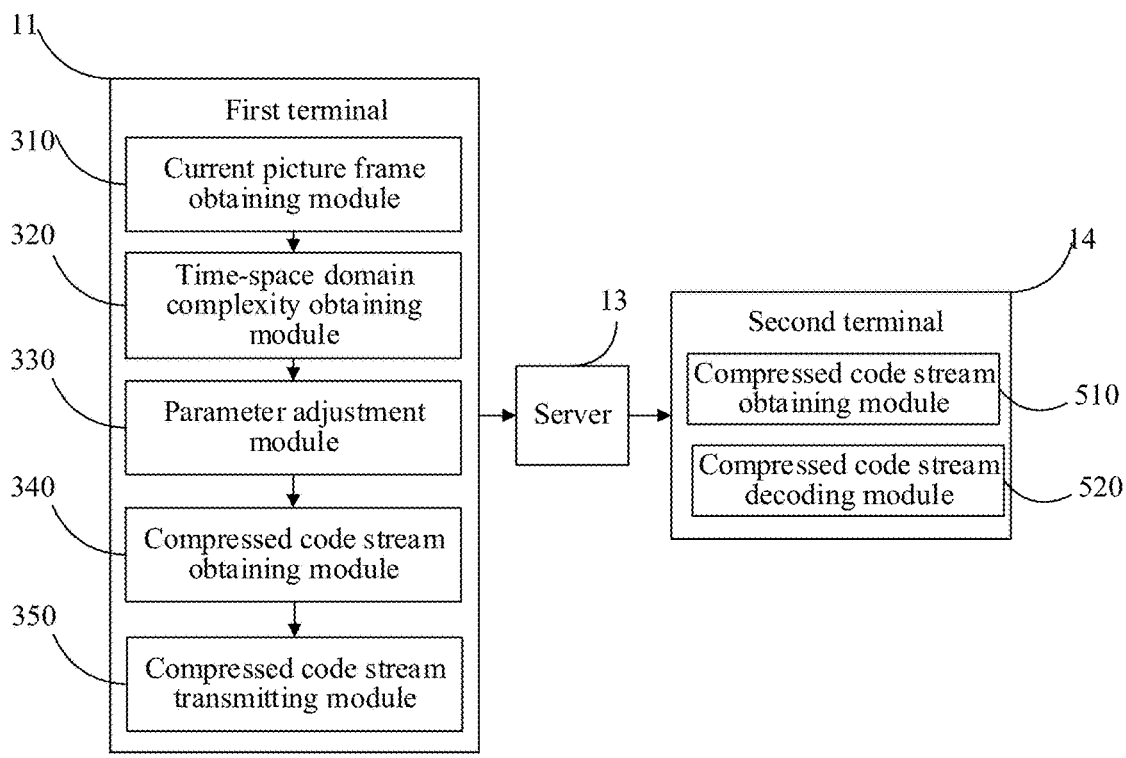
FIG. 18 is a block diagram of a video encoding code rate control system according to an embodiment of this application.

An embodiment provides a video encoding code rate control system. As shown in FIG. 18, the system includes: a first terminal (e.g., 11a or 11b), a server 13, and a second terminal (e.g., 14a or 14b).

The first terminal includes a first picture frame obtaining module 310, a time-space domain complexity obtaining module 320, a parameter adjustment module 330, and a compressed code stream obtaining module 340. The first picture frame obtaining module 310 is configured to obtain a first picture frame in a target video stream.

The time-space domain complexity obtaining module 320 is configured to process the first picture frame to obtain a space domain complexity of the first picture frame and a time domain complexity of the first picture frame.

The parameter adjustment module 330 is configured to adjust a first target bit of the first picture frame according to the space domain complexity and the time domain complexity to obtain a second target bit of the first picture frame; and adjust a first initial quantization parameter of the first picture frame according to the space domain complexity and the time domain complexity to obtain a second initial quantization parameter of the first picture frame.

The compressed code stream obtaining module 340 is configured to obtain a compressed code stream of the first picture frame according to the adjusted second target bit and the initial quantization parameter.

The first terminal further includes a compressed code stream transmitting module 350, configured to transmit the compressed code stream information to a server.

The second terminal includes a compressed code stream obtaining module 510 and a compressed code stream decoding module 520. The compressed code stream obtaining module 510 is configured to obtain the compressed code stream from the server. The compressed code stream decoding module 520 is configured to decode the received compressed code stream.

The system in the system embodiment can be based on the same concept as the method embodiments.

The sequence of the foregoing embodiments of this application are merely for description purpose but do not represent the preference among the embodiments.

A person of ordinary skill in the art may understand that all or some of the steps of the embodiments may be implemented by hardware or a program instructing related hardware. The program may be stored in a computer-readable storage medium (e.g., a non-transitory computer-readable storage medium). The storage medium may include: a read-only memory, a magnetic disk, or an optical disc.

The foregoing descriptions are merely exemplary embodiments of this application, and are not intended to limit this application. Any modification, equivalent replacement, improvement and the like made within the spirit and principle of this application fall within the protection scope of this application.

What is claimed is:

1. A video encoding code rate control method of a terminal device, the method comprising:
    obtaining, by processing circuitry of the terminal device, a space domain complexity and a time domain complexity of a first picture frame in a video stream;
    updating, by the processing circuitry, a first target bit of the first picture frame to a second target bit according to the space domain complexity and the time domain complexity;
    updating, by the processing circuitry, a first initial quantization parameter of the first picture frame to a second initial quantization parameter according to a ratio of the space domain complexity of the first picture frame and a space domain complexity of a second picture frame; and generating, by the processing circuitry, a compressed code stream of the first picture frame according to the second target bit and the second initial quantization parameter.

2. The video encoding code rate control method according to claim 1, wherein the updating the first target bit of the first picture frame comprises:
obtaining a motion estimation attribute of the first picture frame and a motion estimation attribute of the second picture frame, the motion estimation attribute of the first picture frame being a ratio of the space domain complexity to the time domain complexity of the first picture frame and indicating motion intensity of the first picture frame, the motion estimation attribute of the second picture frame being a ratio of the space domain complexity to a time domain complexity of the second picture frame and indicating motion intensity of the second picture frame, and the second picture frame being a previous picture frame of the first picture frame; and
updating the first target bit of the first picture frame to the second target bit according to a ratio of the motion estimation attribute of the first picture frame to the motion estimation attribute of the second picture frame.

3. The video encoding code rate control method according to claim 1, wherein the updating the first initial quantization parameter of the first picture frame comprises:
updating the first initial quantization parameter of the first picture frame to the second initial quantization parameter according to (i) the ratio of the space domain complexity of the first picture frame to the space domain complexity of the second picture frame, and (ii) a ratio of the space domain complexity of the first picture frame to a space domain complexity of a previous picture frame of the second picture frame.

4. The video encoding code rate control method according to claim 2, wherein the updating the first target bit of the first picture frame comprises:
adjusting the first target bit of the first picture frame to the second target bit according to a bit adjustment function based on the motion estimation attribute of the first picture frame being less than a section parameter.

5. The video encoding code rate control method according to claim 3, wherein the updating the first initial quantization parameter of the first picture frame comprises:
updating the first initial quantization parameter of the first picture frame to the second initial quantization parameter according to a first quantization adjustment function.

6. The video encoding code rate control method according to claim 3, wherein after the updating the first initial quantization parameter of the first picture frame to the second initial quantization parameter, the method further comprises:
updating at least one of (i) a first maximum quantization parameter of the first picture frame to a second maximum quantization parameter according to a second quantization adjustment function, or (ii) a first minimum quantization parameter of the first picture frame to a second minimum quantization parameter according to a third quantization adjustment function.

7. The video encoding code rate control method according to claim 5, further comprising:
updating the second initial quantization parameter to a target initial quantization parameter according to a fourth quantization adjustment function based on the second initial quantization parameter being greater than a quantization parameter critical threshold.

8. The video encoding code rate control method according to claim 1, wherein the obtaining the space domain complexity of the first picture frame comprises:
obtaining an optimal intra-frame prediction cost of a first basic unit in the first picture frame; and
obtaining the space domain complexity of the first picture frame according to the optimal intra-frame prediction cost of the first basic unit.

9. The video encoding code rate control method according to claim 1, wherein the obtaining the time domain complexity of the first picture frame comprises:
obtaining an optimal inter-frame prediction cost of a first basic unit in the first picture frame; and
obtaining the time domain complexity of the first picture frame according to the optimal inter-frame prediction cost of the first basic unit.

10. The video encoding code rate control method according to claim 1, further comprising:
obtaining the first picture frame in the video stream;
transmitting the compressed code stream to a server, wherein
the obtaining the space domain complexity and the time domain complexity includes processing the first picture frame to obtain the space domain complexity and the time domain complexity of the first picture frame.

11. A video encoding code rate control apparatus, comprising:
processing circuitry configured to
obtain a space domain complexity and a time domain complexity of a first picture frame in a video stream,
update a first target bit of the first picture frame to a second target bit according to the space domain complexity and the time domain complexity,
update a first initial quantization parameter of the first picture frame to a second initial quantization parameter according to a ratio of the space domain complexity of the first picture frame and a space domain complexity of a second picture frame, and
generate a compressed code stream of the first picture frame according to the second target bit and the second initial quantization parameter.

12. The video encoding code rate control apparatus according to claim 11, wherein the processing circuitry is configured to
obtain a motion estimation attribute of the first picture frame and a motion estimation attribute of the second picture frame, the motion estimation attribute of the first picture frame being a ratio of the space domain complexity to the time domain complexity of the first picture frame and indicating motion intensity of the first picture frame, the motion estimation attribute of the second picture frame being a ratio of the space domain complexity to a time domain complexity of the second picture frame and indicating motion intensity of the second picture frame, and the second picture frame being a previous picture frame of the first picture frame; and
update the first target bit of the first picture frame to the second target bit according to a ratio of the motion estimation attribute of the first picture frame to the motion estimation attribute of the second picture frame.

13. The video encoding code rate control apparatus according to claim 11, wherein the processing circuitry is configured to
update the first initial quantization parameter of the first picture frame to the second initial quantization parameter according to (i) the ratio of the space domain complexity of the first picture frame to the space domain complexity of the second picture frame, and (ii) a ratio of the space domain complexity of the first picture frame to a space domain complexity of a previous picture frame of the second picture frame.

14. The video encoding code rate control apparatus according to claim 12, wherein the processing circuitry is configured to
adjust the first target bit of the first picture frame to the second target bit according to a bit adjustment function based on the motion estimation attribute of the first picture frame being less than a section parameter.

15. The video encoding code rate control apparatus according to claim 13, wherein the processing circuitry is configured to
update the first initial quantization parameter of the first picture frame to the second initial quantization parameter according to a first quantization adjustment function.

16. The video encoding code rate control apparatus according to claim 13, wherein the processing circuitry is configured to
after the first initial quantization parameter of the first picture frame is updated to the second initial quantization parameter, update at least one of (i) a first maximum quantization parameter of the first picture frame to a second maximum quantization parameter according to a second quantization adjustment function, or (ii) a first minimum quantization parameter of the first picture frame to a second minimum quantization parameter according to a third quantization adjustment function.

17. The video encoding code rate control apparatus according to claim 15, wherein the processing circuitry is configured to
update the second initial quantization parameter to a target initial quantization parameter according to a fourth quantization adjustment function based on the second initial quantization parameter being greater than a quantization parameter critical threshold.

18. The video encoding code rate control apparatus according to claim 11, wherein the processing circuitry is configured to
obtain an optimal intra-frame prediction cost of a first basic unit in the first picture frame; and
obtain the space domain complexity of the first picture frame according to the optimal intra-frame prediction cost of the first basic unit.

19. The video encoding code rate control apparatus according to claim 11, wherein the processing circuitry is configured to
obtain an optimal inter-frame prediction cost of a first basic unit in the first picture frame; and
obtain the time domain complexity of the first picture frame according to the optimal inter-frame prediction cost of the first basic unit.

20. A non-transitory computer-readable storage medium storing instructions which when executed by a processor cause the processor to perform a video encoding code rate control method, the method comprising:
obtaining a space domain complexity and a time domain complexity of a first picture frame in a video stream;
updating a first target bit of the first picture frame to a second target bit according to the space domain complexity and the time domain complexity;
updating a first initial quantization parameter of the first picture frame to a second initial quantization parameter according to a ratio of the space domain complexity of the first picture frame and a space domain complexity of a second picture frame; and
generating a compressed code stream of the first picture frame according to the second target bit and the second initial quantization parameter.

* * * * *